United States Patent [19]
Cochran et al.

[11] Patent Number: 4,885,180
[45] Date of Patent: Dec. 5, 1989

[54] MICROWAVEABLE BAKED GOODS

[75] Inventors: Stuart A. Cochran, East Windsor, N.J.; Earl J. Benjamin, New Rochelle, N.Y.; Mary E. Crocker, Hamilton, N.J.; William C. Seidel, Monsey, N.Y.; Vicki L. Cipriano, E. Brunswick, N.J.

[73] Assignee: General Foods Corporation, White Plains, N.Y.

[21] Appl. No.: 89,643

[22] Filed: Aug. 26, 1987

[51] Int. Cl.4 ............................................... A21D 6/00
[52] U.S. Cl. .................................... 426/241; 426/549; 426/653
[58] Field of Search ................. 426/549, 241, 243, 653

[56] References Cited

U.S. PATENT DOCUMENTS 3,966,990  6/1976  Cremer et al. ..................... 426/241
4,463,020  7/1984  Ottenberg .......................... 426/243
4,560,559  12/1985 Ottenberg .......................... 426/243
4,640,837  2/1987  Coleman et al. .................... 426/653

Primary Examiner—R. B. Penland
Attorney, Agent, or Firm—Thomas A. Marcoux; Thomas R. Savoie; Daniel J. Donovan

[57] ABSTRACT

The invention describes a refrigerated, frozen or shelf stable improved baked good which will substantially retain its palatability upon microwave heating. The improvement is accomplished by the incorporation into the baked good of an effective amount of a chemically-modified starch with the exception of modified starches which are cross-linked only. The chemically-modified starch is preferably a food acceptable acetylated starch, hydroxypropylated starch, succinylated starch, propylated starch or combination. The modified starch is incorporated in an amount sufficient to reduce deterioration in the palatability of the baked good upon microwave heating, preferably from 5 to 30 baker's percent. The starches are derived from potato, corn, wheat, rice and combinations.

7 Claims, No Drawings

MICROWAVEABLE BAKED GOODS

TECHNICAL FIELD

The invention relates generally to farinaceous baked goods. More particularly, the invention relates to a shelf-stable, refrigerated or frozen baked good product which when reheated in a microwave oven will retain its palatability, specifically the product will possess a crust and a crumb with a texture more closely equivalent to a freshly baked product when reheated in a microwave oven.

BACKGROUND ART

The modern consumer of processed food is seeking to achieve a high quality food product with a minimum of preparation. This desire has led to the widespread utilization of microwave ovens in the average American household and the use of microwave ovens to heat machine vendable food products. While microwave energy will rapidly heat most food products, not all microwave heated products are able to deliver the same quality as is characteristic of the more traditional conduction oven heated counterpart. This lack of quality is quite prevalent in the area of microwave reheated baked goods.

Problems have arisen with the use of microwave energy for heating traditional yeast-raised wheat-based food products such as bread and roll products. Traditional bread and roll products become impalatable after short exposures to microwave energy. The term palatable or palatability refers to the eating quality of food products. Palatable food products are agreeable to the taste and possess an appetizing appearance and texture.

Upon exposure to microwave energy, the crust of traditional bread and roll products becomes extremely tough and/or soggy as water present within the baked good migrates to the surface crust but does not evaporate off. The crust of such microwave exposed products may become so tough that it is difficult to tear such products. The bread product itself may become soggy or develop hard lumpy portions. The crumb of the products becomes rubbery and gummy and is difficult to chew. Consequently, traditional bread and roll products, upon exposure to microwave energy, are not palatable.

U.S. Pat. Nos. 4,560,559 and 4,463,020 to Ottenberg discuss the preparation of yeast-raised wheat-based food products having improved resistance to deterioration caused by microwave heating. The earlier patent accomplished this improvement by the incorporation of from about 5 to about 60 percent by weight of the weight of the wheat flour of a long-grain rice flour. The later patent accomplished the improvement by the incorporation of a similar amount of a rice starch, corn starch or wheat starch possessing an average crystal size less than 20 microns. Both Ottenberg patents disclose that the food product containing the starch should not be in a frozen state when reheated by microwave energy and if a frozen product is produced it should be defrosted or thawed before being heated in a microwave oven. Additionally, the later patent teaches that the incorporation of potato starches do not improve the microwaveability of yeast-raised wheat-based food Products.

There is a need in the food science art to produce a shelf-stable, refrigerated or frozen baked good which will substantially retain its palatability upon microwave heating. In the case of the frozen baked good to be microwave-heated, it would be beneficial if such a product could be taken out of the freezer and directly heated by microwave energy without the need of defrosting or thawing prior to microwaving.

DISCLOSURE OF THE INVENTION

The present invention relates to an improved shelf-stable, refrigerated or frozen baked good which will substantially retain its palatability upon microwave reheating. The improvement is brought about by the incorporation into the baked good of an effective amount of a chemically-modified starch, the amount being effective to reduce deterioration in the palatability of the baked good upon microwave heating. The modified starches are preferably potato, corn, wheat, rice and combinations. Most preferably the modified starch is a chemically-modified potato starch. The improved baked good when microwave heated will possess a crust and a crumb with a texture more closely equivalent to a freshly baked product.

BEST MODE FOR CARRYING OUT THE INVENTION

The chemically-modified starch is preferably incorporated into the baked good at a level of from about 5 to about 30 baker's percent, most preferably from about 8 to about 15 baker's percent. Unless otherwise noted, all percentages refer to baker's weight percents wherein the weight of each non-flour ingredient contained in the baked good formulation is expressed as a weight percent of the flour ingredient of the formulation. The bottom end of the range is limited by the amount of the modified starch necessary to provide significant resistance to the deterioration in palatability upon exposure of the food product to microwave energy. The upper end of the addition range of greater than 30 baker's percent of the modified starch produces an acceptable crust following microwave reheating, however, poor crumb condition and reduced loaf volume make levels beyond 30 baker's percent impractical.

All chemically modified starches when incorporated into a baked good in effective amounts will reduce deterioration in the palatability of the baked good upon microwave heating except for modified starches which are crosslinked only. The chemically-modified starches may be crosslinked as long as they are also modified in some other manner, i.e. acetylated or hydroxypropylated. Crosslinked starches alone do not produce acceptable microwave-reheated baked goods. Additionally, the chemically modified starches must be food acceptable. The preferred chemically modified starches are acetylated, hydroxypropylated, succinylated and propylated. Combinations of these preferred modified starches may also be utilized. The chemical modifications are well known to those skilled in carbohydrate chemistry. Further details on specific methods of modification can be found in Methods in Carbohydrate Chemistry, Volume IV Starch, Edited by Roy L. Whistler published by Academic Press, 1964 in pages 286 to 288 (Esters-Acetylation) and pages 304 to 306 (Ethers-Hydroxyethyl and Hydroxypropylstarch) which is herein incorporated by reference. For additional information on modified starches see §172.892 entitled Food starch-modified in 21 CFR Ch.1 (4-1-87 Edition) issued by the Food and Drug Administration. Preferably, in the case of acetylation, the degree of substitution of acetyl groups should not exceed 2.5%; in the case of hydroxypropylation, the degree of substitution of hydroxylpropyl groups should not exceed 25%.

While not wishing to be limited to a specific theory, the present inventors believe that the microwave tolerance brought about by the incorporation of the chemically-modified starches is due to the fact that the starch modifications enables the modified starch to soak up water faster than unmodified starches. Simply stated, the chemically-modified starches possess a high water holding capacity. During the microwave reheating of a baked good product, water migrates out of the center of the product towards the outer crust. The chemically-modified starches act to absorb this water thus making the baked good more palatable after microwave reheating.

The incorporation of the chemically-modified starches into shelf-stable, refrigerated or frozen baked goods which are designed to be microwave reheated perform well in lean (French bread type) and rich (sweet) dough formulas as well as laminated (croissant and danish) doughs, batters (muffins), pizza doughs and cake batters. Since many cake batters have incorporated some starches as ingredients and since cakes do not have a pronounced crust and/or the crusts are covered with icing, the problems associated with microwave reheating of cake products are not as severe as with the other baked goods.

In accordance with the present invention, the farinaceous baked good is made by preparing the dough or batter by conventional means and techniques. All standard formulations may be utilized with the only exception that the chemically-modified starches heretofore described are incorporated into the formulations, preferably at a level of from 5 to 30 baker's percent. With each formulation, mixing, fermentation, shaping, proofing and baking are handled as is customary to a skilled artisan in the trade. All standard dough systems, straight, sponge, no-time and liquid ferment can be utilized with the present invention. After the batter or dough is prepared and/or proofed, the product is baked for the appropriate time and temperature to achieve a complete bake.

The baked good product may be yeast-leavened or it may include chemical leavening agents within the dough or batter formulation. Various flours can be used to form the baked good product of the present invention. Examples of such flours are those conventionally used in the baking industry including bread flour, corn flour, potato flour, pastry flour, cracker flour and cake flour.

Other ingredients, which may be incorporated into the formulation for the baked good of the present invention, include the following:

Shortening or lubricating substitutes such as oils add lubrication to food products so they may be easily sliced, chewed and swallowed. Shortening or oil also provides lubrication for the mixing of flour and water into the dough, helping the dough retain natural gases that are utilized in the baking process. Overall, adding an effective amount of shortening or oil adds good taste and texture appeal to the wheat-based food products. Water is added to form the doughs in conventional amounts.

Preferred embodiments of the invention contain salt. Salt helps control fermentation of the yeast and provides flavor to the baked good food product.

Other conventional ingredients that may also be included in the baked good formulations include nonfat dry milk; whole eggs, dried eggs or dried egg yolk; flavoring agents which include natural and synthetic flavorings; food coloring; minerals and vitamins.

The baked good product which contains the modified starch may be shelf-stable, refrigerated or frozen. Shelf-stable for purposes of this application shall refer to a baked good which is distributed and sold to the ultimate consumer without being refrigerated or frozen. Preferably, the baked good product is frozen. The consumer simply removes the frozen baked good product from a food freezer and places the frozen product directy into a microwave oven without the need to thaw or defrost the product. The improvement associated with the present invention brought about by the incorporation of modified starches makes all baked goods tolerant to microwave reheating although it is most noticeable in products that must be microwaved a longer period of time, i.e. microwave reheating of a frozen baked good. The product will be microwave heated for a period of time sufficient to warm it to the proper serving temperature, typically ranging from 15 seconds to 3 minutes, preferably 45 seconds to 3 minutes for the frozen baked goods, depending on the power setting, quantity of product to be reheated and wattage of the particular oven.

This invention is further described but not limited to the Examples set forth below.

EXAMPLE 1

A frozen bread enrobed filled entree product was produced which was adapted to be reheated in a microwave oven. The bread dough was produced from the following formula:

| Ingredient | Baker's Percent |
|---|---|
| Bread Flour | 100.0 |
| Water | 60.0 |
| Yeast | 2.5 |
| Vegetable Oil | 1.12 |
| Nondiastatic Malt | 2.25 |
| Salt | 1.75 |
| Starch | 10.0 |

The starch which was utilized was a hydroxypropylated and crosslinked corn starch entitled MIRA-CLEER 340 starch produced by A. E. Staley Manufacturing Company. The ingredients were added together and mixed with a dough hook in a 20 quart Hobart mixer for one minute on low speed and nine minutes on high speed. The dough was then allowed to ferment for three hours. The dough was then sheeted out on a Rondo brand sheeter to 2 mm thick and cut to shape. A filling which consisted of ground sausage with pepper and onions was added and enrobed. The enrobed product was then proofed for 20 minutes and then subsequently baked for 25 minutes at 450° F. The product was allowed to cool and was then frozen and held at 0° F.

To reheat the product, it was placed in a microwave oven (directly from the freezer) for 2½ minutes at mmedium-high power setting. Thereafter the product was allowed to cool at ambient temperature for approximately one minute. The reheated product possessed a palatable crust and a tender crumb texture which closely approximated that of a fresh baked product.

EXAMPLE 2

An improved frozen enrobed filled entree product which is designed to develop a crisp crust when reheated in a microwave oven was prepared from the following ingredients:

| Ingredient | Baker's Percent |
|---|---|
| Bread Flour | 100.0 |
| Water | 60.0 |
| Yeast | 2.5 |
| Vegetable Oil | 1.12 |
| Nondiastatic Malt | 2.25 |
| Salt | 1.75 |
| Chemically Modified Starch | 10.0 |

The chemically modified starch utilized was Perfectamyl AC Starch manufactured by Avebe which is a high viscous grade potato starch which has been modified by moderate acetylation.

The ingredients were combined to form a dough which was mixed with a dough hook in 20 quart Hobart mixer for one minute on low speed and nine minutes on high speed. The dough was then allowed to ferment for three (3) hours. The dough was then sheeted out on a Rondo brand sheeter to 2 mm thick and cut to shape. A filling which consisted of ground sausage with pepper and onions was added and enrobed. The enrobed product was then proofed for 20 minutes and then subsequently baked for 25 minutes at 450° F. The product was allowed to cool and was then frozen and held at 0° F.

To reheat the product, the frozen enrobed product was placed in a microwave oven for 2½ minutes at medium-high power. Thereafter the product was allowed to cool at ambient temperature for approximately one minute.

The reheated product was compared to a control product which had the exact formulation and preparation with the exception of the addition of the chemically-modified starch. The product of the present invention when reheated possessed a crisp, tender crust with a tender crumb compared to the control product which had a tough, leathery, soggy crust with a rubbery crumb.

EXAMPLE 3

A wide variety of farinaceous dough products were prepared according to the formulas set forth below. In each instance, a product representing the invention which incorporated a chemically-modified starch was compared to a control product which had the exact formulation with the exception of the addition of the modified starch. Both products (inventive product and control) were produced in the exact fashion utilizing conventional bakery techniques and the products were frozen.

| Lean Dough (French Bread Type) | Bakers % |
|---|---|
| Hi-Gluten Flour | 100.00 |
| Compressed Yeast | 2.00 |
| Water | 65.75 |
| Shortening | 1.00 |
| Sugar | 3.00 |
| Salt | 2.00 |
| Modified Starch | 10.00 |

| Rich Dough | Bakers % |
|---|---|
| Patent Flour | 100.00 |
| Compressed Yeast | 2.00 |
| Modified Starch | 10.00 |
| Salt | 2.00 |
| Sugar | 8.00 |
| Shortening | 6.00 |
| Nonfat Dry Milk | 4.00 |
| Water | 63.00 |

| Laminated Dough (Croissant) | Bakers % |
|---|---|
| Hi-Gluten Flour | 100.00 |
| Compressed Yeast | 5.00 |
| Sugar | 6.00 |
| Salt | 1.80 |
| Nonfat Dry Milk | 3.00 |
| Butter | 6.00 |
| Water | 65.75 |
| Modified Starch | 10.00 |
| Laminate Roll-in (Butter) | 45.00 |

| Danish Dough | Bakers % |
|---|---|
| Hi-Gluten Flour | 100.00 |
| Sugar | 18.00 |
| Salt | 1.50 |
| Nonfat Dry Milk | 3.00 |
| Shortening | 15.00 |
| Dry Egg Yolk | 3.00 |
| Flavor | 2.15 |
| Compressed Yeast | 6.00 |
| Water | 63.00 |
| Modified Starch | 10.00 |
| Roll-in (Margarine) | 40.00 |

| Corn Bread | Bakers % |
|---|---|
| Hi-Gluten Flour - 65% Yellow Corn Meal - 35% | 100.00 |
| Modified Starch | 10.00 |
| Sugar | 3.00 |
| Shortening | 5.00 |
| Salt | 2.00 |
| Compressed Yeast | 2.50 |
| Water | 65.00 |

| Muffins | Bakers % |
|---|---|
| All Purpose Flour | 100.00 |
| Sugar | 60.00 |
| Salt | 1.50 |
| Nonfat Dry Milk | 7.50 |
| Shortening | 40.00 |
| Dry Eggs | 7.50 |
| Water | 82.20 |
| Baking Powder | 5.00 |
| Modified Starch | 10.00 |

In each instance the chemically-modified starch utilized was the perfectamyl AC Starch previously described in Example 2.

The products were reheated in a microwave oven and were taste tested. The products containing the chemically modified starches were preferred over the control products because they possessed a crust and crumb texture more closely equivalent to a freshly baked product.

EXAMPLE 4

Comparative Example

To compare the results brought about by the present invention versus the teachings set forth in the Ottenberg patents, three separate batches of lean bread dough were prepared. The following formula was utilized:

| Ingredient | Baker's Percent |
| --- | --- |
| Pillsbury Hi Gluten Flour | 100.0 |
| Compressed Yeast | 2.0 |
| Water | 65.75 |
| Shortening | 1.0 |
| Sugar | 3.0 |
| Salt | 2.0 |
| Starch | 10.0 |

Sample I which was the control did not have any starch incorporated in the formulation. Sample II which was representative of the Ottenberg teachings had 10 baker's percent rice starch having an average starch crystal size from 2 to 5 microns incorporated into the formulation. Sample III which was representative of the present invention had incorporated into the fomulation 10 baker's percent chemically-modified rice starch. The modified rice starch was modified by hydroxypropylation as follows: a 40% suspension of rice starch was prepared and held at 70 to 75° F. The pH of the slurry was raised to 11.5 to 12.0 by the addition of 3% sodium hydroxide. An amount of propylene oxide was added (18% by weight of the slurry) and the mixture was agitated for 24 hours. The pH was then reduced to 6.0 to 6.5 by adding 0.5N hydrochloric acid and then the slurry was filtered thru filter paper on a Buchner funnel. The solids were resuspended in water and filtered for three additonal times to wash the modified starch. Thereafter the modified starch was air dried and ground.

Each of the bread doughs were prepared by combining all ingredients and mixing with a dough hook in a 20 quart Hobart mixer for one minute on low speed and fifteen minutes on high speed. The dough was then allowed to ferment for two hours. The dough was then divided and molded into loaves of uniform size. Thereafter the loaves were placed on a bread rack and proofed for 60 minutes at 105° F./85% relative humidity. The proofed loaves were baked for 20-25 minutes in a 400° F. oven. The baked loaves were then frozen overnight at 0° F.

In order to evaluate the samples, the frozen loaves were individually placed in a microwave oven and were reheated for 2 minutes 15 seconds at the high setting. The loaves were allowed to cool before they were taste tested. The control (Sample I) had a chewy, tough, leathery crust with a fairly tender crumb. Sample II was found to have a very flaky, crisp crust which was very tough and chewy. The crumb was judged to be fairly tender but slightly gummy. Sample III was judged to be superior to the other samples in that it had a crisp and slightly chewy crust with a tender crumb.

I claim:

1. An improved self stable, refrigerated or frozen baked good which will substantially retain its palatability upon microwave reheating wherein the improvement comprises the incorporation into the batte or dough of the baked good an effective amount of a chemically-modified starch, with the exception of modified starches which are crosslinked only, to reduce substantially deterioration in the palatability of the baked good upon microwave reheating whereby the baked and reheated baked good closely resembles a freshly baked product 2. The product of claim 1 wherein the modified starches are incorporated at a level of from 5 to 30 baker's percent.

3. The product of claim 2 wherein the level is from 8 to 15 baker's percent.

4. The product of claim 1 wherein the modified starches are potato, corn, wheat, rice and combinations thereof.

5. The product of claim 4 wherein the modified starch is a chemically-modified potato starch.

6. The product of claim 1 wherein the chemically-modified starch is a food acceptable acetylated starch, hydroxypropylated starch, succinylated starch, propylated starch or combinations thereof.

7. The product of claim 1 wherein the improved baked good is frozen and is microwave-heated without being defrosted or thawed.

* * * * *